Oct. 25, 1955  R. G. EATON  2,721,488
MANUFACTURE OF DIAMOND CUTTING WHEELS OR SAWS
Filed May 4, 1954
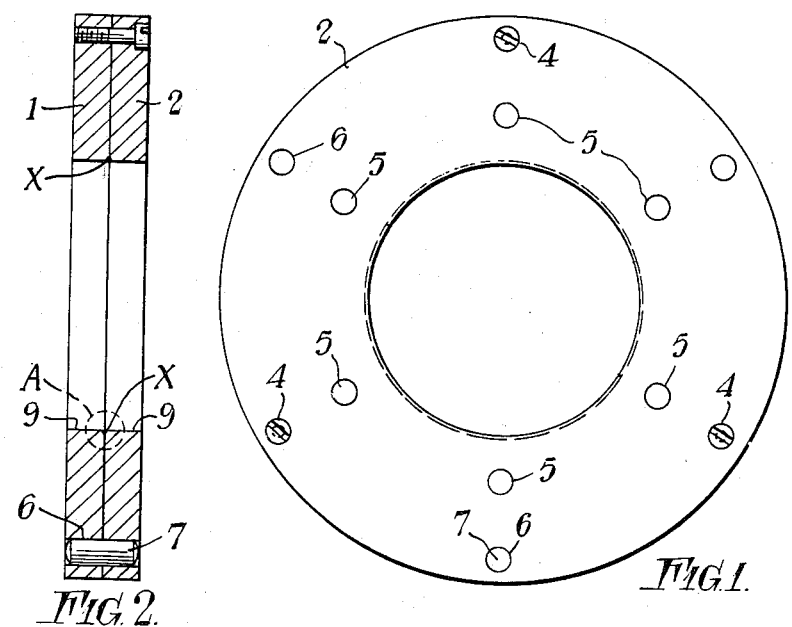
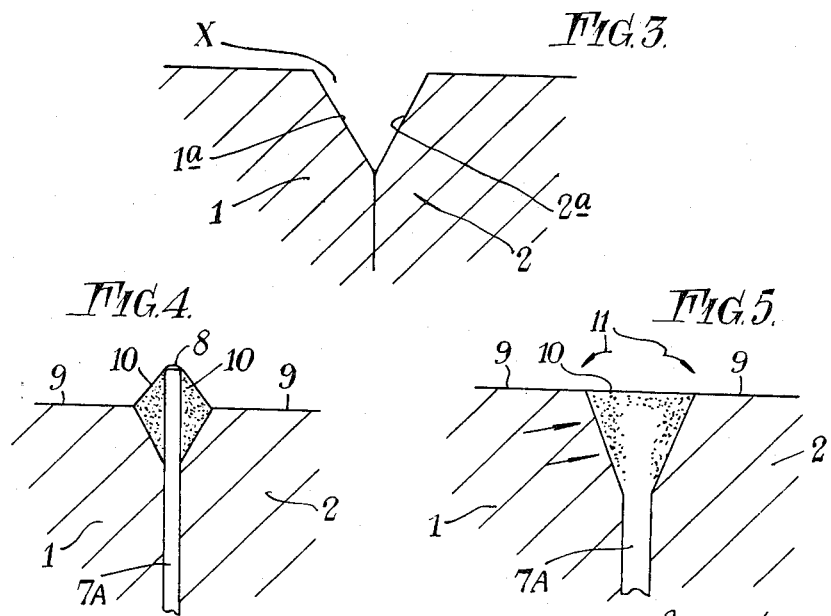

United States Patent Office 2,721,488
Patented Oct. 25, 1955

2,721,488

MANUFACTURE OF DIAMOND CUTTING WHEELS OR SAWS

Robert George Eaton, Hackbridge, England, assignor to Marconi's Wireless Telegraph Company Limited, London, England, a British company Application May 4, 1954, Serial No. 427,540

Claims priority, application Great Britain June 1, 1953

1 Claim. (Cl. 76—112)

This invention relates to the manufacture of diamond cutting wheels or saws and more particularly to such cutting wheels or saws of the kind, hereinafter referred to briefly as internal diamond cutting wheels, wherein the wheel has a central hole the periphery of which carries the diamond material and forms the cutting edge.

Internal diamond cutting wheels are considerably better than wheels with their cutting edges at the outside periphery for cases in which it is required to cut very hard materials with great precision. Though not the only use of such wheels an important application thereof is to the cutting of piezo electric quartz and similar crystals. Such crystals are very hard and valuable and must, of course, be cut with great precision and economy.

Internal diamond cutting wheels as at present in use have the defect of very short life. The wear on the cutting edge is extremely high and after a very short time indeed they have to be replaced. Since diamond wheels are very expensive this defect is exceedingly serious and the present invention has for its object to provide improved internal diamond cutting wheels of much improved working life.

According to this invention there is provided a method of making an internal diamond cutting wheel comprising the steps of positioning a wheel whose edge is to be formed between a pair of clamps, one on each side thereof with similar aligned circular holes which are co-axial with the central hole in the wheel and of slightly larger diameter so that the marginal portion of said wheel around said central hole projects a short distance inwardly of the edges of the clamp holes, said clamp holes being relieved at the side edges which are opposed when said clamps are assembled so as to form a groove with said marginal portion of the wheel hole projecting inwardly therefrom; applying diamond carrying material in said groove and to the sides of the projecting marginal portion of the wheel; and deforming the said portion of the wheel to force it and the adjacent diamond carrying material into the groove and thereby result in a wheel whose inner circular edge lies substantially in the cylindrical surface containing the inner edges of the clamp holes with the diamond material firmly embedded in the deformed portion of said wheel.

The invention is illustrated in the accompanying drawings in which Figures 1 and 2 show in face view and section elevation respectively an assembly of a pair of clamps for use in carrying out the invention the wheel not being shown in these figures; Figure 3 is an enlarged view showing the clamp bevelling which provides the V groove, the wheel again not being shown; Figure 4 is an enlarged schematic representation showing part of the clamps and of the wheel between them together with the diamond carrying material before cold forming; while Figure 5 is a view similar to Figure 4 showing the result after cold forming and indicating the action which takes place during cold forming.

Referring to the drawings there are two annular clamps 1 and 2 which can be clamped together face to face by means of screws or the like such as 4 which can be entered into holes 5, the holes in one clamp being tapped to receive the screws. As shown the screw holes are arranged in two concentric circles, three in the outer circle and six in the inner circle. Midway between the holes in the outer circle are holes 6 to take register dowel pins such as 7. In Figure 1 the two clamps 1, 2 are shown assembled face to face but without a wheel, between them. The adjacent flat faces of the clamps are ground as flat as possible and when assembled together as in Figure 2 they have a common cylindrical central hole. Half-way along this hole at X, is a V-shaped groove which is formed by bevelling the adjacent edges or corners of the holes in the clamps. This is best shown in Figure 3 which represents to an enlarged scale the arrangement within the dotted line circle A of Figure 2. The bevelling is shown at 1a and 2a and as will be seen forms a V-shaped groove X when the clamps are assembled as in Figure 2. These clamps, which together act as a jig, are made of suitably hard steel.

In use the clamps are assembled with a wheel between them as indicated in Figure 4 which is a schematic enlarged view of the same nature as that of Figure 3. In Figure 4 part of a wheel 7A is shown between the clamps. The dimensions are such that the marginal portion of the inner edge 8 of the wheel, which latter may be of commercial rolled copper of about one hundredth of an inch in thickness, projects about three hundredths of an inch above i. e. internally of, the general cylindrical surface 9 formed by the coaxial clamp holes. Thus the marginal portion of the inner edge of the wheel is symmetrical in the V-groove and projects inwardly thereof a short distance.

The clamps with the wheel between them are at first loosely clamped together and approximately 0.75 carat of diamond (for an arrangement of the dimensions referred to above of about 100 to 120 mesh (openings per linear inch) is mixed with a quantity of zinc paste and fed into the V-shaped groove between the bevels and also on to the side faces of the projecting inner edge of the wheel. This diamond carrying material of diamond and zinc paste is indicated at 10 in Figure 4.

The wheel is now carefully centred in the jig constituted by the clamps so that an even amount of material is left protruding and the said clamps are tightened together sufficiently to hold the wheel firmly. The internally projecting material consisting of the copper wheel and adjacent diamond-containing paste, is now gently hammered into the groove by means of a light ball hammer until the inner edge of the wheel is substantially level with the cylindrical surface 9. The result of cold forming by hammering is best shown in Figure 5 in which the curved arrows 11 indicate what happens to the metal of the wheel 7A during cold forming.

The two clamps are now tightened together as much as possible and any surplus copper that again appears is again gently hammered down. The final result is that the diamond is forced against the unyielding opposed faces of the clamp bevels into the copper of the wheel giving a finished wheel in which the diamond is very firmly held and which is of much improved working life as compared to known comparable wheels. The final step in manufacture is to scrape away any small amount of surplus material that may lie inside the cylindrical surface 9 whereupon the finished wheel after removal from between the clamps, may be degreased and is ready for use.

The section of the leading or cutting edge of the finished wheel depends upon the shape of the bevelling of the clamps and this may be chosen to suit requirements. The bevels may conveniently be made by a one dioptre lap.

The cold forming achieved by hammering represents a convenient practical method of proceeding. However, hammering is not the only available technique and satisfactory results can be obtained by cold rolling.

In the above description the wheel 7A has been described as being made from rolled copper. It is desirable to employ uniformly rolled copper having a Brinell hardness number of 75. At hardness number 100 there is difficulty in producing a satisfactory take-up of the diamond particles, whilst at hardness number 150 the take-up is negligible.

The main advantages of a wheel in accordance with this invention are (a) there is good content of diamond on the cylindrical inner surface of the finished wheel, (b) there is diamond content on the inner edge of the wheel to a depth of at least 1/16", (c) there is a spread of the edge of about 0.0025" on each side of the original wheel blank—above assumed to be one hundredth of an inch thick, (d) there is a depth of diamond insertion which roughly corresponds to the useful life of the copper of which the wheel blank is made (e) fine diamond grit can be used and will be firmly held, and (f) the method of cold forming beds the diamond grit into the cutting edge sufficiently to hold it during cutting while allowing fresh cutting surfaces to be revealed during the useful life of the wheel.

I claim:

A method of making an internal diamond cutting wheel comprising the steps of positioning a wheel whose edge is to be formed between a pair of clamps, one on each side thereof with similar aligned circular holes which are coaxial with the central hole in the wheel and of slightly larger diameter so that the marginal portion of said wheel around said central hole projects a short distance inwardly of the edges of the clamp holes, said clamp holes being relieved at the side edges which are opposed when said clamps are assembled so as to form a groove on each side of said marginal portion of the wheel projecting inwardly therefrom; applying diamond carrying material in said grooves and to the sides of the projecting marginal portion of the wheel; and deforming the said portion of the wheel to force it and the adjacent diamond carrying material into the grooves and thereby result in a wheel whose inner circular edge lies substantially in the cylindrical surface containing the inner edges of the clamp holes with the diamond material firmly embedded in the deformed portion of said wheel.

References Cited in the file of this patent

UNITED STATES PATENTS

| | | |
|---|---|---|
| 261,198 | Barton | July 18, 1882 |
| 282,364 | Pickering | July 31, 1883 |
| 323,006 | Whitney | July 28, 1885 |
| 1,099,984 | Kirsten | June 16, 1914 |
| 1,712,034 | Fromm | May 7, 1929 |
| 2,293,238 | Bond | Aug. 18, 1942 |
| 2,508,042 | Rehnberg | May 16, 1950 |

FOREIGN PATENTS

| | | |
|---|---|---|
| 528,834 | Great Britain | Nov. 7, 1940 |
| 655,234 | France | Apr. 16, 1929 |